Figure 1:
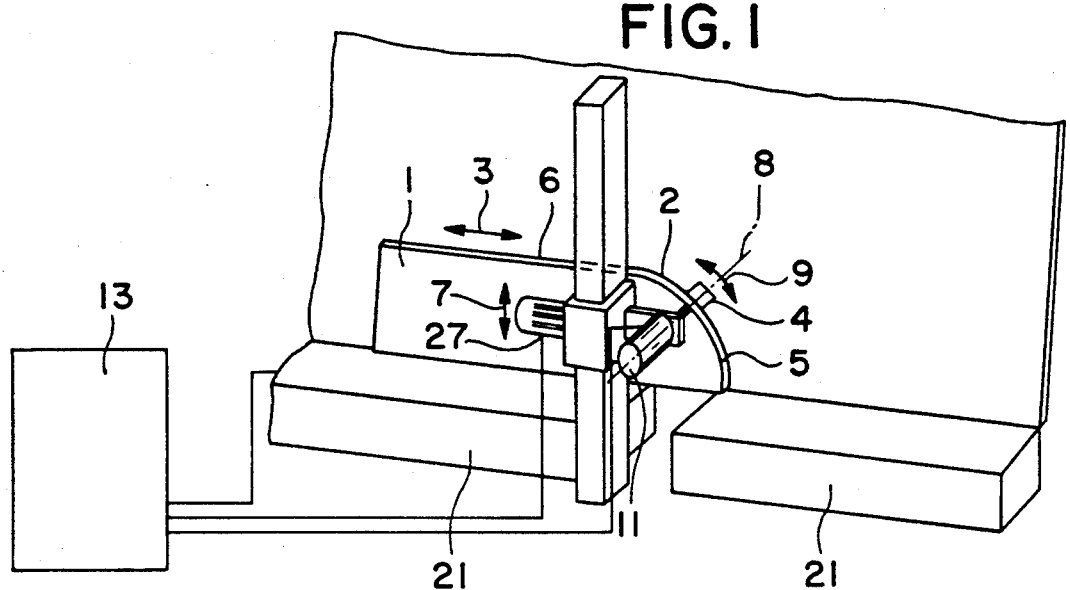

United States Patent [19]

Lisec

[11] Patent Number: 5,136,974
[45] Date of Patent: Aug. 11, 1992

[54] APPARATUS FOR FILLING THE EDGE GROOVE OF INSULATING GLASS PANES WITH SEALING COMPOUND

[76] Inventor: Peter Lisec, Bahnhofstrasse 34, A-3363 Amstetten-Hausmening, Austria

[21] Appl. No.: 496,953

[22] Filed: Mar. 20, 1990

[30] Foreign Application Priority Data

Apr. 3, 1989 [AT] Austria .................................. 775/89

[51] Int. Cl.⁵ .............................................. B05C 5/02
[52] U.S. Cl. ..................... 118/673; 118/668; 118/686; 118/696; 118/712; 118/323; 118/410; 156/107; 156/109; 156/356; 156/357; 425/141; 425/150
[58] Field of Search ............... 118/679, 686, 215, 240, 118/254, 317, 323, 410, 668, 673, 696, 712; 156/107, 109, 390, 356, 357, 575, 578; 425/127, 594, 141, 150; 228/9, 11, 43

[56] References Cited

U.S. PATENT DOCUMENTS

| | | | |
|---|---|---|---|
| 3,962,024 | 6/1976 | Stehl | 156/107 |
| 4,125,943 | 11/1978 | Ando | 228/9 |
| 4,519,962 | 5/1985 | Schlienkamp | 156/107 |
| 4,545,156 | 10/1985 | Hockett | 118/323 |
| 4,564,410 | 1/1986 | Clitheros et al. | 156/578 |
| 4,577,499 | 3/1986 | Silks et al. | 228/9 |
| 4,696,256 | 9/1987 | Lenhardt | 156/578 |
| 4,708,762 | 11/1987 | Lenhardt | 156/107 |
| 4,714,425 | 12/1987 | Lenhardt | 156/109 |

FOREIGN PATENT DOCUMENTS

| | | |
|---|---|---|
| 0176388 | 4/1986 | European Pat. Off. . |
| 0252066 | 1/1988 | European Pat. Off. . |
| 2816437 | 8/1979 | Fed. Rep. of Germany . |
| 2845475 | 9/1979 | Fed. Rep. of Germany . |
| 2846785 | 12/1979 | Fed. Rep. of Germany . |
| 2834902 | 2/1980 | Fed. Rep. of Germany . |
| 2907210 | 12/1982 | Fed. Rep. of Germany . |
| 3217410 | 11/1983 | Fed. Rep. of Germany . |
| 3038425 | 2/1984 | Fed. Rep. of Germany . |
| 87108429 | 11/1987 | Fed. Rep. of Germany . |
| 0158766 | 2/1983 | German Democratic Rep. ................................ 156/107 |
| 2016960 | 9/1979 | United Kingdom . |

*Primary Examiner*—W. Gary Jones
*Assistant Examiner*—Todd J. Burns
*Attorney, Agent, or Firm*—Young & Thompson

[57] ABSTRACT

For filling the edge groove (26) of an insulating glass pane (1) of an arbitrarily designed outer contour with sealing compound, stored geometrical data of the outer contour of the insulating glass pane (1) are utilized for controlling the relative motion between the insulating glass pane (1) and the filling nozzle (4). The relative velocity of the relative motion between the insulating glass pane (1) and the filling nozzle (4) is varied in such a way that the desired extent of filling of the edge groove (26) remains constant even in case of a change in the depth of the edge groove and/or in case of fluctuating feeding rate of a sealing compound. Furthermore, the relative speed between the filling nozzle (4) and the insulating glass pane (1) is selected to be higher in the zone of linear or less strongly curved sections (6) of the edge groove (26) than in the zone of more strongly curved sections (5). The delivery of the sealing compound to the filling nozzle (4) is performed via a conduit (46) guided through a hollow shaft (34) carrying the filling nozzle (4) so that the conduit (46) does not impede the rotatability of the filling nozzle (4).

4 Claims, 3 Drawing Sheets

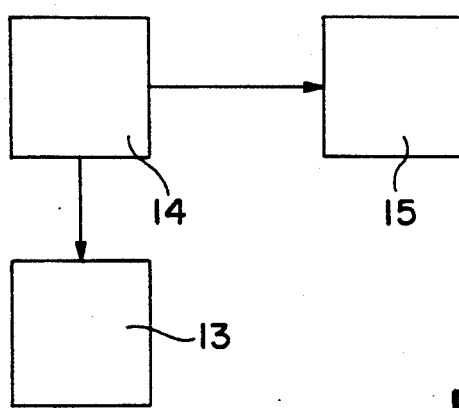
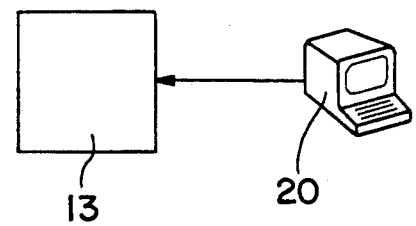
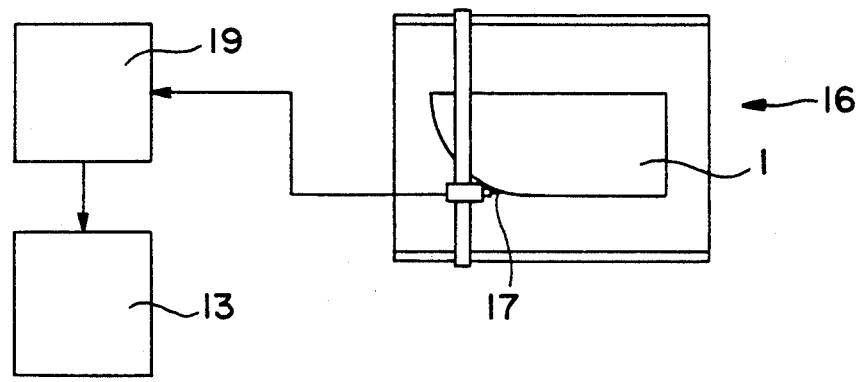
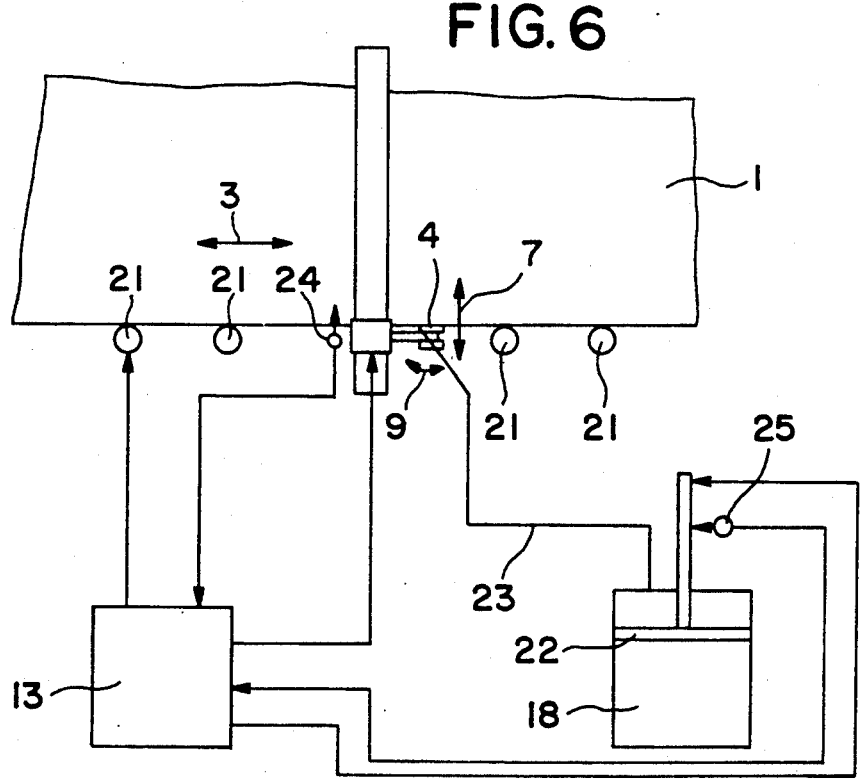

APPARATUS FOR FILLING THE EDGE GROOVE OF INSULATING GLASS PANES WITH SEALING COMPOUND

The invention relates to an apparatus for filling the edge groove of an insulating glass pane with sealing compound, with at least one filling nozzle moved along the edge groove and with a conduit for feeding the sealing compound to the filling nozzle.

Devices for the automatic filling of edge grooves of insulating glass panes have been known, for example, from DOS 2,845,475; German Patent 2,816,437; DAS 2,846,785; DPS 2,834,902; and East German Patent 158,766.

However, these devices are suitable only for filling edge grooves of insulating glass panes having linear outer contours.

EP-A-252,066 discloses the feature of controlling a device for filling the edge grooves of insulating glass panes on the basis of stored data of the insulating glass panes. EP-A-252,066 contains the concrete disclosure of controlling the movements of the filling nozzle(s) and of the insulating glass pane, as well as the amount of filling compound delivered, by means of data carriers mounted to the insulating glass. The capacity of these data carriers, however, is limited so that they can contain only a restricted number of the actually required data. The idea of varying the velocity at which the filling nozzles are moved along the edge groove of insulating glass panes has not been disclosed in EP-A-252,066.

In the conventional devices of the abovementioned type ("sealing machines"), the sealing compound is delivered by way of freely suspended conduits connected to the filling nozzle. Since the filling nozzles—especially in case only one filling nozzle is provided which injects the filling compound into the edge groove—must be rotated about a plane perpendicular to the plane of the insulating glass pane, problems are encountered on account of the conduits.

The invention is based on the object of providing an apparatus of the type discussed hereinabove wherein the conduits for the sealing compound do not impede the rotatability of the filling nozzle so that the latter can be rotated, for example, readily by 360° or more.

This object has been attained by providing that the filling nozzle is attached to a quill shaft, this shaft being mounted to be rotatable, about an axis of rotation normal to the insulating glass pane, to a slide movable in parallel to the plane of the insulating glass pane on a guide means oriented in parallel to the plane of the insulating glass pane and in a vertical plane; and that the conduit for feeding sealing compound to the filling nozzle is extended through the quill shaft.

In the conventional sealing systems, the amount of sealing compound conveyed to the filling nozzle is adapted to the respectively needed quantity of sealing compound by means of valves and/or by regulation of the conveying means (gear pumps, extruders, conveying cylinders acted upon by a hydraulic medium). This is difficult because of the inertia of the devices since changes cannot be executed within a short time period. Additionally, on account of the elasticity of the conduits between the conveying means (pump) and the filling nozzle, increases in the amount conveyed become effective only with a delay and, conversely, in case of a reduction of the conveyed quantity, too much sealing compound keeps on leaving the filling nozzle for a certain time. Also, the small changes cannot be set exactly and rapidly with the aid of the customarily employed proportioning valves.

DOS 2,907,210 describes a sealing method wherein throttling of the feed of sealing compound is in all cases effected simultaneously with a slowing down of the movement of the insulating glass pane. In DOS 2,907,210, the flow of sealing compound through the filling nozzle and the relative speed between the filling nozzle and the insulating glass pane are to be continuously raised directly proportionately to each other at the beginning of the movement, and are to be lowered continuously at the end of the movement. The DOS 2,907,210 also mentions problems of this control method, namely the requirement of the "delayed" activation of the pump drive mechanism.

In the operation of devices for the filling of the edge groove of insulating glass panes, the amount of sealing compound required on the average is usually set by a corresponding adjustment of the conveying means (e.g. a gear pump, a cylinder pump) and of the valves and is maintained substantially constant during the entire sealing procedure.

However, in these devices, the amount of sealing compound introduced into the edge groove is to be adjustable in an accurate fashion and, if at all possible, without time delays, to the respectively required quantity.

The apparatus according to this invention can exhibit, for this purpose, a control system including a sensor detecting the cross section of the edge groove, thereby varying the speed at which the filling nozzle travels, by moving the insulating glass and/or the nozzle holder, along the sections of the edge groove, in correspondence with the respectively detected value of the size of the cross section pertaining to the edge groove. For this purpose, the width and (average) depth of the edge groove is utilized as the typical variable for the cross section of the edge groove. Since the width of the edge groove will not vary, the depth of the edge groove is determined preferably with the aid of a mechanical or noncontact sensor (probe), as a measure for its cross section and thus for the amount of sealing compound required. Therefore, in one embodiment of the invention the provision is made that a tracer finger provided beside the filling nozzle for detecting the depth of the edge groove is arranged on an arm supported at the end of the quill shaft facing the insulating glass pane, to be pivot able about an axis aligned in parallel to the plane of the insulating glass pane.

In case a change in the depth of the edge groove is determined with the aid of the tracer means, the relative speed between the filling nozzle and the edge groove and thus the amount of sealing compound introduced into the edge groove per unit length thereof is correspondingly raised and, respectively, lowered.

This change in relative speed, i.e. the velocity at which the filling nozzle travels along the edge groove, can be executed quickly and without delays even to a larger degree, when the speed at which the filling nozzle travels and/or the speed at which the insulating pane is moved is altered.

The apparatus of this invention makes it possible to perform sealing without any problems also in the corner zone, and to effect the sealing of insulating glass panes that are not rectangular, thus, for example, of insulating glass panes having round edge sections.

Changes in the depth of the edge groove (the width of the latter being constant), as produced by inaccurately attached spacer frames and occurring particularly also in the corner zone, can be readily controlled when performing the sealing operation with the apparatus of this invention, especially if so-called "servomotors" with a high startup power are utilized for driving the nozzle holder and for driving the conveying means for the insulating glass panes.

When using the apparatus of this invention, the preferred procedure can be to detect the amount of sealing compound delivered per unit time to the filling nozzle, and to reduce the speed with which the filling nozzle is moved along the edge groove in case of reduced delivery rate, and increase this speed in case of raised delivery rate. This makes it possible to compensate for variations in the delivery rate of the conveying means for the sealing compound that can arise, for example, by a change in the temperature of the sealing compound to be conveyed to the filling nozzle (warmer sealing compound can be transported more readily than colder sealing compound). In this way, it is no longer necessary to keep the feeding rate of sealing compound exactly constant. It is understood that changes in the relative velocity between the filling nozzle and the insulating glass pane based on changes in the feeding rate can be superimposed on changes in the relative velocity on account of differing depths of the edge groove. Thus, the case can occur, for example, that a reduction in the relative speed in a zone where the edge groove is deeper is partially or entirely eliminated by an increase in the relative speed, effected because the feeding rate of sealing compound increases. The actual change in relative speed between filling nozzle and edge groove then corresponds to the sum total of both changes in relative speed between the filling nozzle and the insulating glass pane.

The device of this invention is suitable, as mentioned above, also for filling the edge grooves of insulating glass panes with an arbitrarily shaped outer contour with sealing compound. In this context, the geometrical data of the outer contour or of parts of the outer contour of the insulating glass panes are advantageously provided in stored form, and the movements of the nozzle and/or of the insulating glass panes are controlled based on these data.

The procedure herein is advantageously such that the movement of the at least one filling nozzle and/or of the insulating glass pane is controlled based on geometrical data on the outer contour of the insulating glass panes, and that the filling nozzle is swung about an axis of rotation normal to the insulating glass pane in such a manner that the filling nozzle faces in all instances the contour edge of the insulating glass pane.

The relative velocity between the filling nozzle and the insulating glass pane can be adapted to the respective partial section of the outer contour. For this purpose, the speed of the movement of the insulating glass pane in the horizontal direction can be changed and/or the speed of the movement of the filling nozzle normal to the travel direction of the insulating glass pane can be varied.

In the operation of the apparatus of this invention, the method advantageously involves the feature that the velocity at which the filling nozzle is moved along the edge groove of the insulating glass pane is higher in the zone of linear and/or low-curvature edge groove sections than in the zone of corners and/or more strongly curved zones of the edge groove, wherein the amount of sealing compound conveyed to the filling nozzle per unit time is larger at a higher relative speed between the filling nozzle and the insulating glass pane than in case of a lower relative speed. In this connection, the realization is utilized that sections of the edge groove that are linear and only slightly curved can be sealed at a higher relative speed between the filling nozzle and the insulating glass pane, i.e. faster, than corners or sections of the edge groove having a small radius of curvature. The changes in the relative speed between the filling nozzle and the insulating glass pane based on changes in cross section of the edge groove and/or based on, for example, temperature-dependent changes in the feeding rate of the sealing compound then are founded on higher (linear edge groove sections) and, respectively, lower (curved edge groove sections) absolute feeding rates and, respectively, relative speeds.

The rotation of the filling nozzle about the axis of rotation normal to the plane of the insulating glass is preferably brought about by a stepping motor. Thereby, the desired angle of attack of the filling nozzle with respect to the contour edge is maintained in all cases during the movement of the sealing member along the edge groove.

Under practical conditions, the movement of the filling nozzle and/or of the insulating glass pane is controlled by a process computer based on stored geometrical data regarding the outer contour of the insulating glass panes.

It is particularly advantageous to effect control based on the geometrical data utilized by the process computer of a glass cutting table, since in this case it is possible to further utilize already present data.

To determine the geometrical data regarding the outer contour of the insulating glass panes, it is also possible to have a measuring head, for example a light scanning head, travel along the outer contour of the insulating glass pane and transmit the measured data, based on a system of coordinates, to a process computer where the data are stored. Thus, it is also possible to cover contours which are not exactly defined mathematically or geometrically and to utilize them for control.

As for mathematically and geometrically defined outer contours which have not as yet been stored, there is also the possibility of introducing the geometrical data manually into the process computer.

It is likewise feasible to associate the geometrical data on the outer contour of irregularly shaped insulating glass panes with a code under which the data are stored and can be read out again.

Figure 2:
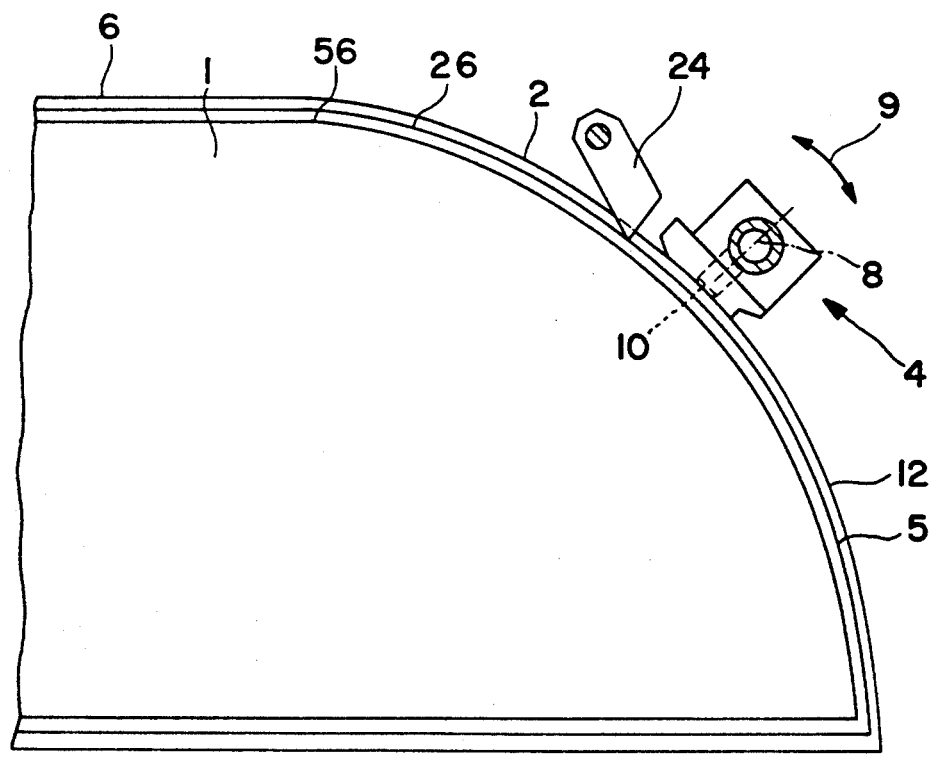
Figure 7:
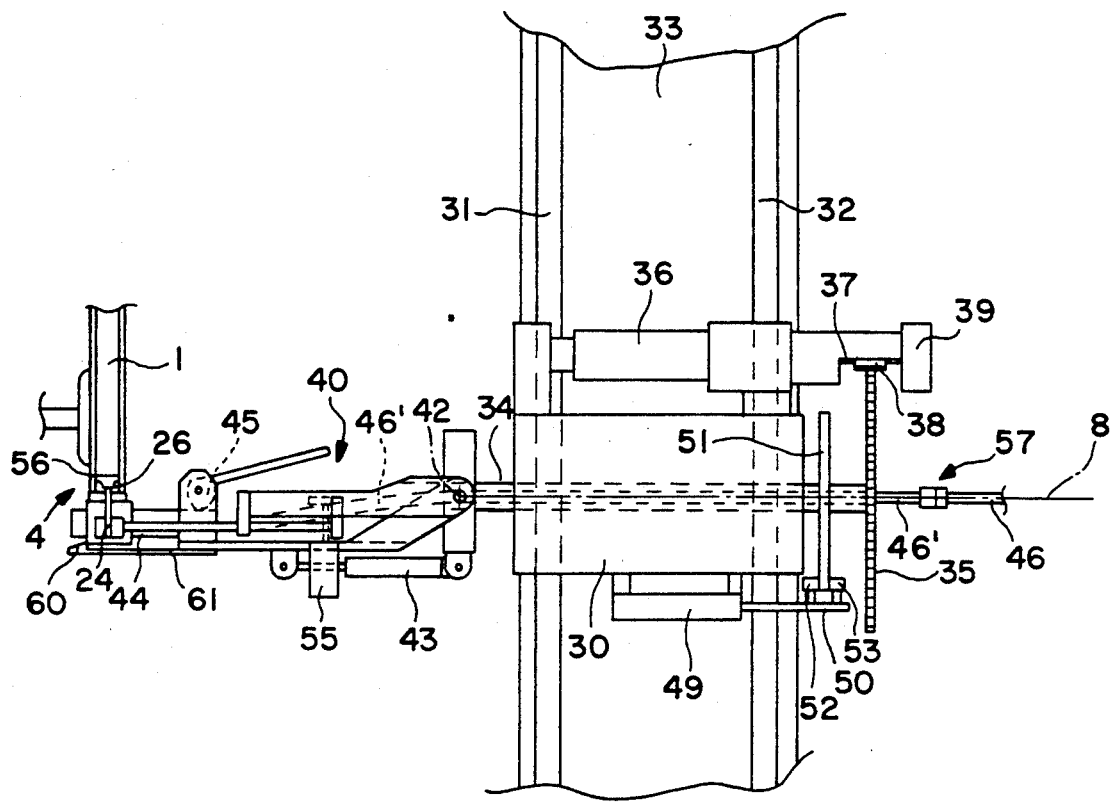
Figure 8:
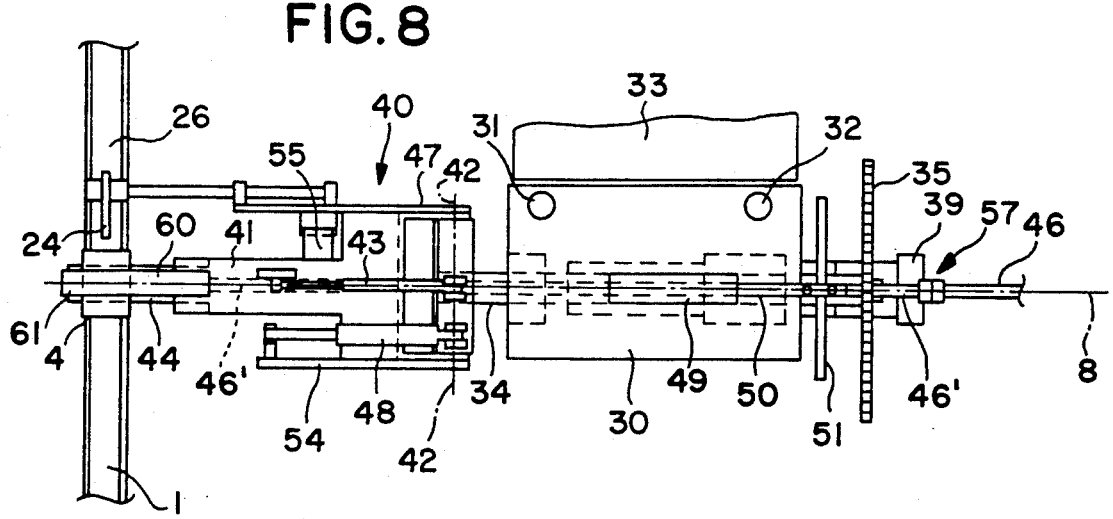

The invention will now be described in greater detail with reference to the drawings wherein:

FIG. 1 shows schematically an oblique view of an apparatus for filling the edge groove of an insulating glass pane, FIG. 2 is an enlarged view of a detail of the apparatus, FIGS. 3–5 show schematically the data flow of the geometrical data on the outer contour of an insulating glass pane, FIG. 6 is a diagram of the control of a sealing unit, FIG. 7 shows the mounting of the filling nozzle and of the tracer finger at the slide, and FIG. 8 shows the mounting of FIG. 7 as seen from the bottom.

An insulating glass pane 1 with an outer contour 2 of arcuate shape along a section of its periphery is moved at an adjustable speed in the direction of double arrow 3 on a horizontal conveyor 21 which latter can be constructed as described in DOS 3,038,425. In this arrangement, the speed of the insulating glass pane 1 is lower while the filling nozzle 4 is located at point 5 (curved edge groove) of the outer contour 2 of the insulating glass pane 1 than in the case where the filling nozzle 4 is located at point 6 (linear edge groove) of the outer contour 2.

The velocity of the filling nozzle 4 likewise changes in the direction of double arrow 7, i.e. normal to the direction of travel of the insulating glass pane 1; in this case, the speed of the filling nozzle 4 decreases during movement from point 5 to point 6 of the outer contour 2.

During this movement, the filling nozzle 4 revolves about an axis 8 in the direction of double arrow 9, this axis standing normal to the plane of the insulating glass pane 1. On account of this rotating motion of the filling nozzle 4, effected by a motor 11, preferably a stepping motor or a hydraulic motor, the correct alignment of the nozzle opening 10 of the filling nozzle 4 with respect to the outer contour 2 of the insulating glass pane 1 is maintained at all times.

However, it is likewise possible to vary, during movement of the filling nozzle 4, the orientation of its nozzle orifice 10 with respect to the insulating glass pane 1 in dependence on the geometry of the outer contour and the relative speed, if this is required in special cases.

The control of the movements of the insulating glass pane 1 and of the filling nozzle 4, as well as of the quantity of sealing compound 12 introduced per unit time into the edge groove by the filling nozzle 4 takes place based on the geometrical data of the outer contour of the insulating glass pane 1, stored in the process computer 13.

FIG. 3 illustrates schematically the data flow of the geometrical data for the insulating glass pane 1 from process computer 14, controlling a glass cutting table 15, to process computer 13 associated with the sealing unit.

FIG. 4 is a schematic view of a measuring table 16 with an insulating glass pane 1, the outer contour of which is traced by a light scanning head 17, the resultant measured data being transmitted to a process computer 19 and, by the latter, to the process computer 13 of the sealing unit.

FIG. 5, finally, illustrates an embodiment wherein the geometrical data of the outer contour of an insulating glass pane are manually fed into a computer 20 and are transmitted from there to the process computer 13 of the sealing unit.

The structure of the apparatus for filling the edge groove of insulating glass panes is not limited to a single filling nozzle 4; rather, two or more filling nozzles 4 can be in operation simultaneously at various locations of the edge groove of the insulating glass pane 1 and, alternatively, a simultaneous filling of the edge grooves of multiple-pane insulating glass by means of juxtaposed filling nozzles is likewise possible, unless cluster nozzles are employed. A possible form of filling nozzles and of cluster nozzles, respectively, is disclosed in DOS 3,217,410.

The apparatus according to this invention makes it possible, with the use of a horizontal conveyor, for example the conveying device known from German Patent 3,038,425, to seal insulating glass panes 1 having at least one straight edge. The lateral support for the insulating glass panes 1 is provided by a supporting wall, designed, for example, as an air cushion wall or as an array of rollers, or by rollers arranged on a vertically adjustable beam and engaging merely at the top rim of the insulating glass panes 1, as known from German Patent 3,038,425.

In case insulating glass panes without linear edges are to be sealed, then the movement of the insulating glass panes can be brought about by means of conveying devices laterally engaging at the panes, for example devices equipped with suction cups.

Although several filling nozzles are utilized in the sealing apparatus of this invention, preference is normally given to devices with one filling nozzle or a cluster nozzle. The reason for this is that the relative speed between the lower, horizontal (linear) rim of the insulating glass pane and the filling nozzle is altered when the second filling nozzle is moved along the section of the edge groove projecting upwardly from the horizontal conveyor. Furthermore, peripheral configurations can occur wherein the direction of travel of the movement of the insulating glass pane must be reversed which would entail a considerable expenditure for providing the control means to regulate the amount of sealing compound to be ejected from the filling nozzle associated with the bottom rim of the insulating glass pane.

FIG. 6 will be used to explain the control of an apparatus for filling the edge groove of an insulating glass pane 1, illustrated merely through a horizontal conveyor made up of conveying rollers 21, a filling nozzle 4, and a storage tank 18 for sealing compound. In this apparatus, the sealing compound contained in the storage tank 18 and under the stress of a piston 22 is conveyed by means of pumps, not shown, via a flexible conduit 23 to the filling nozzle 4.

A sensor 24 detects the depth of the edge groove 26 of the insulating glass pane 1 to be filled. This is sufficient since in the predominant number of cases the size of the cross section of the edge groove 26 is a function of the air interspace of the insulating glass pane 1 and the depth of the edge groove 26, and the air interspace in an insulating glass pane 1 does not vary across the length of the edge groove 26. Another sensor 25 detects the movements of the piston 22 and thus the respective feeding rate of sealing compound to the filling nozzle 4. The data picked up by the sensors 24 and 25 are fed to the process computer 13 of the sealing unit.

The process computer 13 transmits control commands to the horizontal conveyor 21 for the movements of the insulating glass pane 1 in the direction of double arrow 3 and to the drive mechanism for the movement of the filling nozzle 4 in the direction of double arrow 7. Furthermore, the process computer 13 controls the feeding rate of sealing compound to the filling nozzle 4 through conduit 23.

By varying the relative velocity between the filling nozzle 4 and the insulating glass pane 1 in dependence on the depth of the edge groove 26 picked up by the sensor 24 and on the feeding rate determined by the sensor 25, the amount of sealing compound introduced into the edge groove per unit length thereof is regulated in such a way that the edge groove is always filled with sealing compound to the desired extent—usually up to the rim (compare FIG. 4 of DOS 2,834,902).

The feeding rate of sealing compound from the storage tank 18 to the filling nozzle 4 can be increased in linear zones of the edge groove (e.g. section 6 in FIG. 1) and reduced in curved zones of the edge grooves (e.g. section 5 in FIG. 1). Also in case of an intentionally altered feeding rate, the process of this invention as described above ensures an always correct filling of the edge groove of insulating glass panes, even if the depth of the edge groove varies.

By means of the apparatus of this invention, the sealing operation can be performed with insulating glass panes that are conveyed in a horizontal position as well as with panes that are conveyed substantially in a vertically upright position, the latter version being preferred.

The sensor 25 of the arrangement shown in FIG. 6, detecting the feeding rate of sealing compound, can also be associated with the metering cylinder, not illustrated in FIG. 6, usually pertaining to the filling nozzle 4. In this embodiment, the feeding rate of sealing compound to the filling nozzle 4 is picked up by the sensor 25 by detection of the movements of the metering piston in the metering cylinder in the immediate vicinity of the filling nozzle 4. In this way, a further enhancement of the accuracy of the control operation is obtained since losses of sealing compound that may occur, for example, during conveyance thereof from the storage tank to the metering cylinder will remain without influence. Finally, it is also possible to arrange a sensor detecting the feeding rate of sealing compound directly at the filling nozzle 4.

In the preferred embodiment of the filling nozzle 4 illustrated in FIGS. 7 and 8, the filling nozzle is carried by a slide 30 guided, on guide rails 31 and 32, to be displaceable upwards and downwards, the guide rails being mounted to a substantially perpendicularly oriented beam 33 which is affixed to the machine frame or is movable in the direction of the movements of the insulating glass panes 1 (arrow 3 in FIG. 1). In order to move the slide 30 along the guide rails 31 and 32, chain drive mechanisms, not shown, and a motor 27 driving these mechanisms are preferably provided.

A quill shaft 34 is arranged in the slide 30 to be rotatable and to be displaceable in the direction of its axis 8. A pressure medium motor 49 is provided for displacing the shaft 34; the piston rod 50 of this motor carries two rollers 52, 53 engaging from both sides at a disk 51 rigidly joined to the shaft 34.

The shaft 34, of hollow structure, is connected to a gear wheel 35 for turning the quill shaft 34 about the axis 8 oriented perpendicularly to the plane of the insulating glass pane 1, the edge groove 26 of which is to be filled with sealing compound. Furthermore, a drive motor 36 is attached to the slide 30, the shaft 37 of this motor being connected to a pinion 38 meshing with the gear wheel 35. Also, a sensor 39 is connected to the shaft 37 of motor 36, detecting the rotary movements executed by the motor 36 and thus the rotational motions of the shaft 34.

A mounting 40 is provided at the end of the shaft 34 facing the insulating glass pane 1, the edge groove 26 of which is to be filled with sealing compound exiting from the filling nozzle 4; this mounting carries the filling nozzle 4 and a sensor designed as a tracer finger 24 for detecting the depth of the edge groove 26.

This mounting 40 comprises an arm 41 pivotable under the action of a pressure medium cylinder 43 about an axis 42 in parallel to the plane of the insulating glass pane 1, so that the filling nozzle 4 can be urged against the rims of the two glass plates of the insulating glass pane 1. The filling nozzle 4 is fixedly clamped by way of its nozzle body 44 against the arm 41 with the aid of an eccentric 45.

The conduit 46 through which the sealing compound is conveyed to the filling nozzle 4 is extended through the quill shaft 34 and connected to the nozzle body 44.

The tracer finger 24 which, as can be seen from FIGS. 2 and 7, rests during operation of the apparatus on the spacer 56 of the insulating glass pane 1 and glides along this spacer is attached to a further arm 47 supported to be pivotable about the axis 42. In order to place the tracer finger 24 in contact with the spacer means 56, another pressure medium motor 48 is associated with a lever 54 connected to the arm 47.

A sensor 55 is arranged at the mounting 40 between the arm 41 carrying the filling nozzle 4 and the arm 47 carrying the tracer finger 24; this sensor 55 transmits signals corresponding to the relative movements between the arms 41 and 47 and thus the relative movements between the filling nozzle 4 and the tracer finger 24, i.e. the depth of the edge groove 26, to the control unit of the apparatus.

When the apparatus according to this invention is in use, the filling nozzle 4 is brought by moving the slide 30 from a readiness position into contact with the rim of the insulating glass pane 1 and urged thereagainst by activation of the pressure medium cylinder 43. Likewise, the tracer finger 24 is placed into contact with the spacer frame 56 by activation of the pressure medium cylinder 48.

It can be seen that by accommodating the conduit 46 in the interior of the quill shaft 34, the conduits do not impede the rotary movements of the filling nozzle 4, differently than in case of the conventional arrangements wherein the conduits are extended in a freely suspended fashion to the filling nozzle. In order to ensure the rotatability of the section 46' of conduit 46 accommodated within the quill shaft 34 and extended to the filling nozzle 4, with respect to the remaining section of conduit 46, a rotary coupling 57 is provided in conduit 46.

It can furthermore be seen from FIG. 7 that the face of the filling nozzle 4 facing the edge groove 26 of the insulating glass pane 1 is designed to be convex (partially cylindrical), and that the filling nozzle 4 rests on the rims of the glass plates of the insulating glass pane 1. Thereby, one and the same filling nozzle can be utilized for insulating glass panes having a differently wide air gap interspace, and also an advantageous, hollow-throat-like outer surface of the sealing compound introduced into the edge groove 26 is obtained.

As will be apparent from FIGS. 7 and 8, the front end of the nozzle body 44 is in contact with a stop 60 connected to the arm 41 via a leaf spring 61.

What is claimed is:

1. In an apparatus for filling an edge groove (26) of an insulating glass pane (1) with sealing compound comprising at least one filling nozzle (4), and means for moving the filling nozzle along the edge groove (26); the improvement comprising a hollow shaft (34) to which the filling nozzle (4) is attached, a slide (30) supporting the hollow shaft (34) for rotation about an axis of rotation (8) perpendicular to the insulating glass pane having the edge groove (26) to be filled, guide means (31, 32, 33) for guiding the slide (30) for vertical movement parallel to the plane of said insulating glass pane (1), and a conduit (46) for feeding sealing compound to the filling nozzle (4), said conduit extending through said hollow shaft (34), said apparatus further comprising means (24) for detecting the depth of said edge groove (26), and means responsive to variations in the depth of said edge groove as detected by said detecting means for varying the speed of movement of said slide (30) in a vertical direction such that said edge groove (26) will be substantially filled with sealing compound despite variations in the depth of said edge groove (26).

2. In an apparatus for filling an edge groove (26) of an insulating glass pane (1) with sealing compound, comprising at least one filling nozzle (4), and means for moving the filling nozzle along the edge groove (26); the improvement comprising a hollow shaft (34) to which the filling nozzle (4) is attached, a slide (30) supporting the hollow shaft (34) for rotation about an axis of rotation (8) perpendicular to the insulating glass pane having the edge groove (26) to be filled, guide means (31, 32, 33) for guiding the slide (30) for vertical movement parallel to the plane of said insulating glass pane (1), and a conduit (46) for feeding sealing compound to the filling nozzle (4), said conduit extending through said hollow shaft (34), said apparatus further comprising a tracer finger (24) disposed beside the filling nozzle (4), said tracer finger being movable relative to said filling nozzle to detect the depth of the edge groove (26) to be filled, and an arm (47) supported on said hollow shaft (34) for pivotal movement about an axis (42) parallel to the plane of said insulating glass pane, said arm supporting said tracer finger (24).

3. In an apparatus for filling an edge groove (26) of an insulating glass pane (1) with sealing compound, comprising at least one filling nozzle (4), and means for moving the filling nozzle along the edge groove (26); the improvement comprising a hollow shaft (34) to which the filling nozzle (4) is attached, a slide (30) supporting the hollow shaft (34) for rotation about an axis of rotation (8) perpendicular to the insulating glass pane having the edge groove (26) to be filled, guide means (31, 32, 33) for guiding the slide (30) for vertical movement parallel to the plane of said insulating glass pane (1), and a conduit (46) for feeding sealing compound to the filling nozzle (4), said conduit extending through said hollow shaft (34), said apparatus further comprising an arm (41) carrying the filling nozzle (4), said insulating glass pane being flat, and means mounting the arm for pivotal movement about an axis (42) parallel to the plane of said insulating glass pane, said arm being supported at an end of said hollow shaft (34) adjacent said insulating glass pane, and an arm (47) which carries a tracer finger for determining the depth of the edge groove (26), said arm carrying the tracer finger also being pivotal about said axis (42).

4. Apparatus as claimed in claim 3, further comprising a sensor (55) disposed between said arm (41) carrying the filling nozzle (4) and said arm (47) carrying the tracer finger (24), said sensor measuring relative displacement between said arms (41, 47).

* * * * *